(12) United States Patent
Xavier et al.

(10) Patent No.: US 10,217,056 B2
(45) Date of Patent: Feb. 26, 2019

(54) HYPERBOLIC SMOOTHING CLUSTERING AND MINIMUM DISTANCE METHODS

(71) Applicants: Adilson Elias Xavier, Rio de Janeiro (BR); Vinicius Layter Xavier, Rio de Janeiro (BR)

(72) Inventors: Adilson Elias Xavier, Rio de Janeiro (BR); Vinicius Layter Xavier, Rio de Janeiro (BR)

(*) Notice: Subject to any disclaimer, the term of this patent is extended or adjusted under 35 U.S.C. 154(b) by 804 days.

(21) Appl. No.: 14/717,568

(22) Filed: May 20, 2015

(65) Prior Publication Data
US 2016/0019467 A1  Jan. 21, 2016

Related U.S. Application Data (63) Continuation-in-part of application No. 13/513,296, filed as application No. PCT/BR2009/000400 on Dec. 2, 2009.

(51) Int. Cl.
*G06F 15/18* (2006.01)
*G06N 7/02* (2006.01)

(52) U.S. Cl.
CPC ................................ *G06N 7/02* (2013.01)

(58) Field of Classification Search
CPC .................................. G06F 19/24; G06N 7/02
USPC ....................................... 706/12, 15, 20, 45
See application file for complete search history.

(56) References Cited

U.S. PATENT DOCUMENTS

| | | | |
|---|---|---|---|
| 2005/0209785 A1* | 9/2005 | Wells | G06F 19/24 702/19 |
| 2006/0208870 A1* | 9/2006 | Dousson | G05B 23/027 340/506 |

OTHER PUBLICATIONS

Demyanov, Alexei. "On the Solution of Min-sum-min Problems." Journal of Global Optimization 31.3 (2005): 437-453.
Xavier, A. et al. "Optimal covering of plane domains by circles via hyperbolic smoothing." Journal of Global Optimization 31.3 (2005): 493-504.
Xavier, A. et al. "A novel contribution to the tammes problem by the hyperbolic smoothing method." EURO Mini Conference: EurOPT-2008, Lituania. May 2008.

* cited by examiner

*Primary Examiner* — David R Vincent
(74) *Attorney, Agent, or Firm* — Fildes & Outland, P.C.

(57) ABSTRACT

The invention concerns four methodologies regarding the unsupervised clustering of a set of observations in multidimensional space, considering a defined number of clusters. The invention comprises a special procedure for calculating the minimum distance of a given point to a set of points in a multidimensional space, the main component of the first methodology.

21 Claims, 3 Drawing Sheets

HYPERBOLIC SMOOTHING CLUSTERING AND MINIMUM DISTANCE METHODS

CROSS REFERENCE TO RELATED APPLICATIONS

This application is a continuation-in-part of U.S. Application No. 13/513,296 filed Jun. 1, 2012, which is a national stage application of PCT/BR2009/000400 filed Dec. 2, 2009.

TECHNICAL FIELD

The invention concerns four methodologies regarding the unsupervised clustering of a set of observations in multidimensional space, considering a defined number of clusters. The invention comprises a special procedure for calculating the minimum distance of a given point to a set of points in a multidimensional space, the main component of the first methodology.

Clustering is an important problem that appears in a broad spectrum of applications, whose intrinsic characteristics engender many approaches to this problem, as described by R. C. Dubes and A. K. Jain in "Cluster Techniques: The User's Dilemma", Pattern Recognition No. 8 pp. 247-260, 1976 by A. K. Jain and R. C. Dubes in "Algorithms for Clustering Data", Prentice-Hall Inc., Upper Saddle River, N.J., 1988 and by P. Hansen and B. Jaumard, "Cluster Analysis and Mathematical Programming", Mathematical Programming No. 79 pp. 191-215, 1997.

Clustering analysis has been used traditionally in disciplines such as: biology, genetics, biometry, social sciences, psychology, psychiatry, medicine, geology, ecology, statistics including multivariate analysis, business, marketing and finance, and many more. Clustering is also a fundamental tool in modern technology applications, such as: pattern recognition, data mining, web mining, image processing, machine learning and knowledge discovering.

Clustering analysis can be done according to numerous criteria, through different mathematical formulations. The methodologies considered here deal with clustering problems that have a common component: the measure of a distance, which can be done following different metrics.

The first methodology, called hyperbolic smoothing, has a wider scope, and can be applied to clustering according to distances measured in different metrics, such as those known as Euclidian, Minkowski, Manhattan and Chebychev norms. Furthermore, this first methodology is the basis for the other ones.

The second methodology considers the partition of the set of observations into two groups: "data in the frontier" and "data in gravitational regions". This method is particularly useful in combination with the first method. The resulting effect is a desirable substantial reduction of the computational effort necessary to solve the clustering problem.

The third methodology involves a specific combination of the two previous methodologies considering the case of the Euclidean norm. It achieves a faster response time when compared to the second methodology, while keeping the full robustness of the first methodology.

The fourth methodology does the same as the third methodology, but for the L1 norm, keeping the robustness and increasing the speed of the response.

The fifth methodology considers the calculation of the minimum distance of a given point to a set of points in a Euclidian multidimensional space in a completely differentiable way. It is the kernel component of the first methodologies above, and can be applied to a broader class of problems.

GENERAL DESCRIPTION OF THE CLUSTERING PROCEDURE

Cluster analysis deals with problems of classification of a set of patterns or observations, in general represented as points in a multidimensional space, into clusters, following two basic and simultaneous objectives: patterns in the same cluster must be similar to each other (homogeneity objective) and also different from patterns in any other cluster (separation objective), as shown by J. A. Hartingan in "Clustering Algorithms", John Wiley and Sons, Inc., New York, N.Y., 1975 and by H. Späth in "Cluster Analysis Algorithms for Data Reduction and Classification", Ellis Horwood, Upper Saddle River, N.J., 1980.

There are two main strategies for solving clustering problems: hierarchical clustering methods and partition clustering methods. Hierarchical methods produce a hierarchy of partitions of a set of observations. Partition methods, in general, assume a given number of clusters and, essentially, seek the optimization of an objective function measuring the homogeneity within the clusters and/or the separation between the clusters.

The present invention is related to solving unsupervised clustering problems following the general formulation presented below.

Let $S=\{s_1, \ldots, s_n\}$ denote a set of m patterns or observations from a Euclidean n-space to be clustered into a given number q of disjoint clusters. To formulate the original clustering problem as a min-sun-min problem, we proceed as follows. Let $x_i$, $i=1, \ldots, q$ be the centroids of the clusters, where each $x_i \in R^n$. The set of these centroid coordinates will be represented by $X=(x_1, \ldots, x_q) \in R^{nq}$. Given a point $s_j$ of S, let us denote by $z_j$ the minimum distance of this point to the nearest centroid $$z_j = \min_i \|s_j - x_i\|, \qquad (1)$$

where $\|s_j - x_i\|$ is the distance following a given metric.

The measurement of the quality of a clustering associated to a specific position of q centroids is provided by a function of the set of these distances.

$$D(X) = \sum_{j=1}^{m} f(z_j) \qquad (2)$$

where $f(z_j)$ is an arbitrary monotonic increasing function of the distance $z_j$. Some trivial examples of this kind of function are: $\sum_{j=1}^{m} z_i$ or $\sum_{j=1}^{m} z_i^2$.

The optimal placing of the centroids must provide the best quality of this measurement. Therefore, if $X^*$ denotes an optimal placement, then the problem is $$X^* = \arg \min_{X \in R^{nq}} D(X) \qquad (3)$$

where X is the set of all placements of the q centroids. Using (1)-(3), we finally arrive at $$X^* = \arg \min_{X \in R^{nq}} \sum_{j=1}^{m} f\left(\min_{x_i \in X} \|s_j - x_i\|\right). \quad (4)$$

GENERAL DESCRIPTION OF THE MINIMUM DISTANCE PROCEDURE

The minimum distance of a given point to a set of points in a Euclidian multidimensional space, as considered by equation (1), is a common component in a broad class of mathematical problems.

The present invention proposes an approximate calculation of this distance in a completely differentiable way.

PREVIOUS TECHNIQUES

In the cluster analysis scope, algorithms traditionally use two main strategies: hierarchical clustering methods and partition clustering methods as described by P. Hansen and B. Jaumard in "Cluster Analysis and Mathematical Programming", Mathematical Programming No. 79 pp. 191-215. 1997 and by A. K. Jain, M. N. Murty and P. J. Flynn in "Data Clustering: A Review", ACM Computing Surveys, Vol. 31, No. 3, September 1999.

Hierarchical methods, essentially heuristic procedures, produce a hierarchy of partitions of the set of observations according to an agglomerative strategy or to a divisive one. In the former case, the general algorithm starts from an initial partition, in which each cluster contains only one pattern, and successively merges two clusters on the basis of a similarity measure, until all patterns are in the same cluster. In the latter case, the general algorithm starts from an initial partition with all patterns in the same cluster and, by successive bipartitions, reaches a partition in which each cluster contains one single pattern. In both strategies, the best partition is chosen, by a suitable criterion, from the hierarchy of partitions obtained.

Partition methods, in general, assume a given number of clusters and, essentially, seek the optimization of an objective function measuring the homogeneity within the clusters and/or the separation between the clusters. Heuristic algorithms of the exchange type, as the traditional k-means approach, are frequently used to find a local minimum of the objective function.

The k-means is one of most used tools in data mining applications, as presented by X. Wu et alli in "Top 10 algorithms in data mining", Knowledge and Information Systems, Springer, 14, pp 1-37, 2008. It has been studied by many authors as presented by H. H. Bock in "Clustering methods: A History of k-means Algorithms", in "Selected Contributions in Data Analysis and Classification", editor P. Brito, G. Cucunel, P. Bertrand and F. Carvalho, Springer, pp 161-172, 2007. A simple version is presented in J. Mc Queen, "Some Methods for Classification and Analysis of Multivariate Observations", in Proceedings of the Fifth Berkeley Symposiums on Mathematical Statistics and Probability, pp. 281-297, 1967 and variations are presented in M. R. Anderberg, "Cluster Analysis for Applications", Academic Press Inc., New York, 1973, and H. Späth, "Cluster Analysis Algorithms for Data Reduction and Classification", Ellis Horwood, Upper Saddle River, N.J., 1980. For instances with a moderate number of observations (m<3000), k-means algorithms have a fast performance. However, the results are strongly dependent on the initial choice of the starting point.

Moreover, several mathematical programming techniques have been applied, with limited success, to solving the global optimization problem:

dynamic programming as presented in R. E. Jensen, "A Dynamic Programming Algorithm for Clustering Analysis", Operations Research No. 17 pp. 1043-1057, 1969;

branch and bound as presented in W. L. G. Koontz, P. M. Narendra and P. M. Fukuraga, "A Branch and Bound Clustering Algorithm", IEEE Transactions on Computers No. 24 pp. 908-915, 1975;

interior point algorithms as presented in O. du Merle, P. Hansen, B. Jaumard and V. Mladenovic, "An Interior Point Algorithm for Minimum Sum-of-Squares Clustering", SIAM Journal on Scientific Computing No. 21 pp. 1485-1505, 2000;

bilinear programming as presented in 0. L. Mangasarian, "Mathematical Programming in Data Mining", Data Mining and Knowledge Discovery, Vol. 1, No. 2, pp 183-201, 1997;

all kinds of metaheuristics as presented in, for example: C. R. Reeves, "Modern Heuristics Techniques for Combinatorial Problems", Blackwell, London, 1993, or J. Pacheco and O. Valencia, "Design of Hybrids for Minimum Sum-of-Squares Clustering Problem", Computational Statistics and Data Analysis No. 43 pp. 235-248, 2003;

nonsmooth optimization as presented in A. M. Bagirov and J. Yearwood, "A New Nonsmooth Optimization Algorithm for Minimum Sum-of-Squares Clustering Problems", European Journal of Operational Research, 170 pp. 578-596, 2006.

DETAILED DESCRIPTION OF THE INVENTION

The detailed description is divided in five major parts: General Hyperbolic Smoothing Clustering Methodology, Boundary and Gravitational Regions Partition Methodology, Boundary and Gravitational Regions Partition Methodology Applied to the Euclidian Metric, Boundary and Gravitational Regions Partition Methodology Applied to the Manhattan Metric and the Hyperbolic Smoothing Minimum Distance procedure.

GENERAL HYPERBOLIC SMOOTHING CLUSTERING METHODOLOGY

The core focus of the first methodology is the smoothing of a min-sun-min problem engendered by the clustering specification. In a sense, the process whereby this is achieved is an extension of a smoothing scheme, called Hyperbolic Smoothing, used in different contexts for solving nondifferentiable problems in general, as presented in A. B. A. Santos, "Problemas de Programação Não-Diferenciável: Uma Metodologia de Suavização", M.Sc. Thesis-COPPE-UFRJ, Rio de Janeiro, 1997 for solving the min-max problem as presented in A. M. V. Chaves, "Resolução do Problema Minimax Via Suavizacao", M.Sc. Thesis-COPPE- UFRJ, Rio de Janeiro, 1997 and for the covering of plane domains by circles as presented in A. E. Xavier and A. A. F. Oliveira, "Optimal Covering of Plane Domains by Circles Via Hyperbolic Smoothing", Journal of Global Optimization 31 (3), Kluwer, 2005. This technique was developed through an adaptation of the hyperbolic penalty method originally presented in A. E. Xavier, "Penalização Hiperbólica: Urn Novo Método para Resolução de Problemas de Otimização", M.Sc. Thesis-COPPE-UFRJ, Rio de Janeiro, 1982.

By smoothing we fundamentally mean the substitution of an intrinsically nondifferentiable two-level problem by a $C^\infty$ differentiable single-level alternative. This is achieved through the solution of a sequence of differentiable subproblems which gradually approaches the original problem. In the present application, each subproblem, through the use of the Implicit Function Theorem, can be transformed into a low dimension unconstrained one, which, owing to its being indefinitely differentiable, can be comfortably solved by using the most powerful and efficient algorithms, such as conjugate gradient, quasi-Newton or Newton methods.

Problem (4) above can be formulated equivalently as $$\text{minimize} \sum_{j=1}^{m} f(z_j) \tag{5}$$

$$\text{subject to } z_j = \min_{i=1,\ldots,q} \|s_j - x_i\|, \, j = 1, \ldots, m.$$

Considering its definition, each $z_j$ must necessarily satisfy the following set of inequalities:

$$z_j - \|s_j - x_i\| \leq 0, \, i = 1, \ldots, q \tag{6}$$

Substituting these inequalities for the equality constraints of problem (5), the relaxed problem becomes $$\text{minimize} \sum_{j=1}^{m} f(z_j) \tag{7}$$

$$\text{subject to } z_j - \|s_j - x_i\| \leq 0, \, j = 1, \ldots, m \; i = 1, \ldots, q.$$

Since the variables $z_j$ are not bounded from below, the optimum solution of the relaxed problem will be $z_j = 0$, $j=1, \ldots, m$. In order to obtain the desired equivalence, we must, therefore, modify problem (7). We do so by first letting $\varphi(y)$ denote $\max\{0,y\}$ and then observing that, from the set of inequalities in (7), it follows that $$\sum_{i=1}^{q} \varphi(z_j - \|s_j - x_i\|) = 0, \, j = 1, \ldots, m \tag{8}$$

Figure 1:
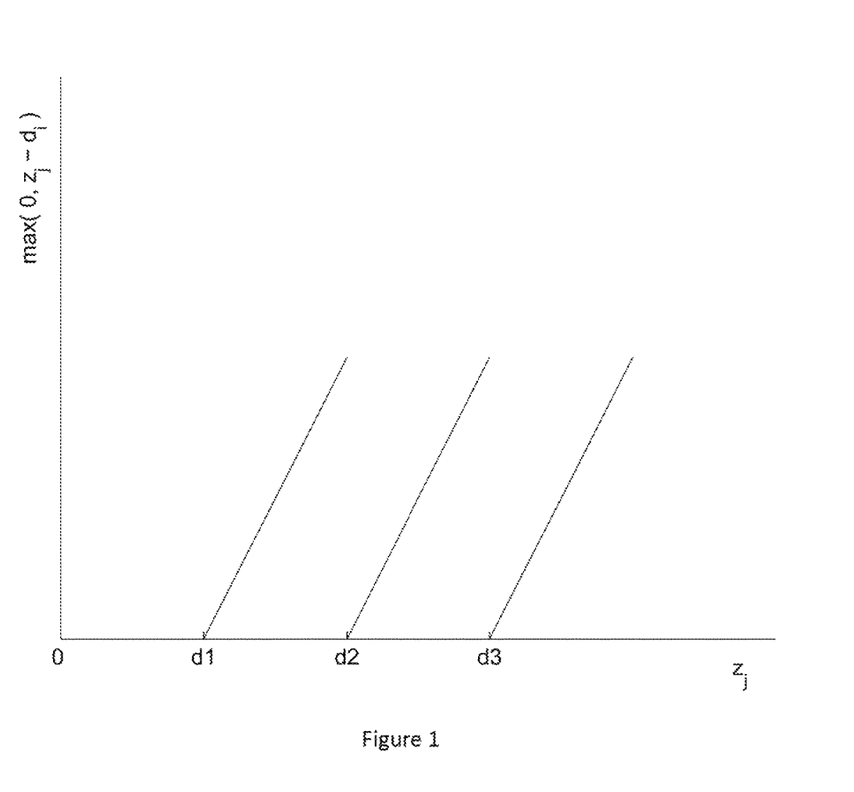
FIG. 1 is a graph of the first three summands of formula (8) as a function of $z_j$.

For fixed j and assuming $d_1 < \ldots < d_q$ with $d_i = \|s_j - x_i\|$, FIG. 1 illustrates the first three summands of (8) as a function of $z_j$.

Using (8) in place of the set of inequality constraints in (7), we would obtain an equivalent problem maintaining the undesirable property that $z_j$, $j=1, \ldots, m$ still has no lower bound. Considering, however, that the objective function of problem (7) will force each $z_j$, $j=1, \ldots, m$ downward, we can think of bounding the latter variables from below by considering ">" in place of "=" in (8) and considering the resulting "non-canonical" problem $$\text{minimize} \sum_{j=1}^{m} f(z_j) \tag{9}$$

$$\text{subject to } \sum_{i=1}^{q} \varphi(z_j - \|s_j - x_i\|) > 0, \, j = 1, \ldots, m.$$

The canonical formulation can be recovered from (9) by perturbing (8) and considering the modified problem:

$$\text{minimize} \sum_{j=1}^{m} f(z_j) \tag{10}$$

$$\text{subject to } \sum_{i=1}^{q} \varphi(z_j - \|s_j - x_i\|) \geq \varepsilon, \, j = 1, \ldots, m$$

for $\varepsilon > 0$. Since the feasible set of problem (9) is the limit of (10) when $\varepsilon \to 0$, we can then consider solving (9) by solving a sequence of problems like (10) with a sequence of decreasing values for $\varepsilon$ approaching 0.

Analyzing problem (10), the definition of function $\varphi$ turns it into an extremely rigid nondifferentiable structure, which makes its computational solution very hard. In view of this, the numerical method we adopt for solving problem (1) takes a smoothing approach. From this perspective, let us define the function:

$$\phi(y, \tau) = \frac{\left(y + \sqrt{y^2 + \tau^2}\right)}{2} \tag{11}$$

For $y, \tau \in R$ and $\tau > 0$.
Function $\phi$ has the following properties:
(a) $\phi(y,\tau) > \varphi(y), \forall \tau > 0$;
(b)
$$\lim_{\tau \to 0} \phi(y, \tau) = \varphi(y);$$

(c) $\phi(y,\tau)$ is an increasing convex $C^\infty$ function in variable y.

Therefore, function $\phi$ constitutes an approximation of function $\varphi$. Adopting the same assumptions used in FIG. 1, the first three summands of (8) and their corresponding smoothed approximations, given by (11), are depicted in FIG. 2.

By using function $\phi$ in the place of function $\varphi$, the problem turns into $$\text{minimize} \sum_{j=1}^{m} f(z_j) \tag{12}$$

$$\text{subject to } \sum_{i=1}^{q} \phi(z_j - \|s_j - x_i\|, \tau) \geq \varepsilon, \, j = 1, \ldots, m$$

Figure 2:
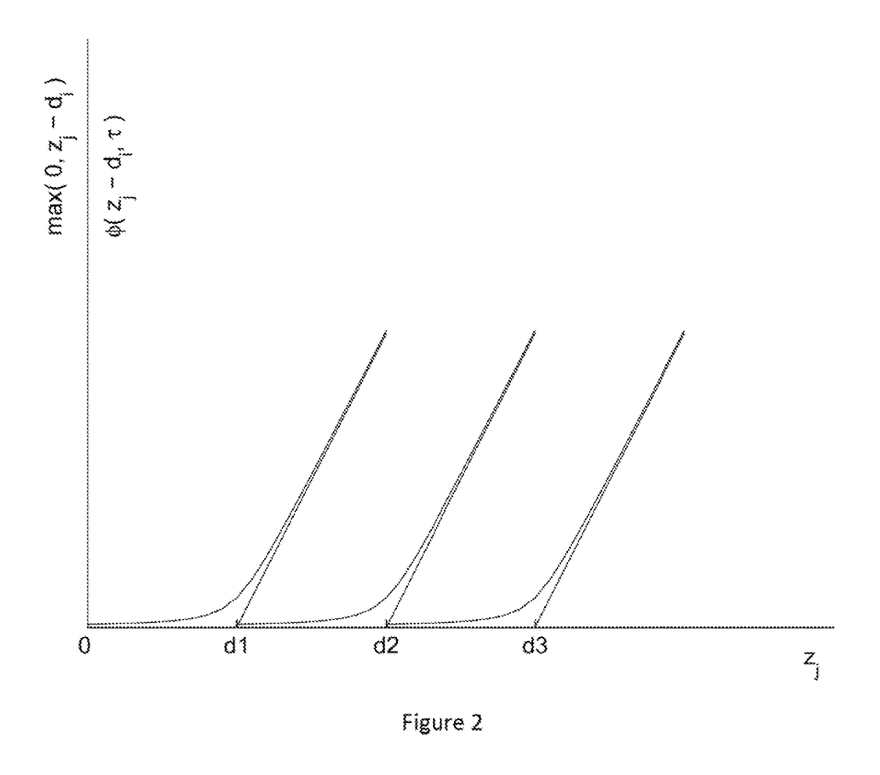
FIG. 2 is a graph of original and corresponding smoothed approximations of the first three summands of formula (8)

FIG. 2 shows the original and smoothed summands in (8)

SMOOTHING METRICS

To obtain a differentiable problem, it is still necessary to smooth the distance $\|s_j - x_i\|$. The smoothing procedures for the mostly used metrics are presented: $L_2$(Euclidian), $L_p$(Minkowski), $L_1$(Manhattan) and $L_\infty$(Chebychev).

EUCLIDIAN METRIC

For the Euclidian distance associated to the $L_2$ metric, let us define the approximation function $$\theta_2(s_j, x_i, \gamma) = \sqrt{\sum_{i=1}^{n}(s_j^l - x_i^l)^2 + \gamma^2} \quad (13)$$

for $\gamma > 0$.

Function $\theta_2$ has the following properties:

(a)
$$\lim_{\gamma \to 0} \theta_2(s_j, x_i, \gamma) = \|s_j - x_i\|_2;$$

(b) $\theta_2$ is a $C^\infty$ function.

MINKOWSKI METRIC

For the case of distances associated to the $L_p$ metric, let us define the approximation function $$\theta_p(s_j, x_i, \gamma) = \left(\sum_{i=1}^{n}[(s_j^l - x_i^l)^2 + \gamma^2]^{p/2}\right)^{1/p} \quad (14)$$

for $\gamma > 0$:

Function $\theta_p$ has the following properties:

(a)
$$\lim_{\gamma \to 0} \theta_p(s_j, x_i, \gamma) = \|s_j - x_i\|_p;$$

(b) $\theta_p$ is a $C^\infty$ function.

MANHATTAN METRIC

For the case of distances associated to the $L_1$ metric, let us define the approximation function $$\theta_1(s_j, x_i, \gamma) = \sum_{i=1}^{n}\sqrt{(s_j^l - x_i^l)^2 + \gamma^2} \quad (15)$$

for $\gamma > 0$.

Function $\theta_1$ has the following properties:

(a)
$$\lim_{\gamma \to 0} \theta_1(s_j, x_i, \gamma) = \|s_j - x_i\|_1;$$

(b) $\theta_1$ is a $C^\infty$ function.

CHEBYCHEV METRIC

For the case of distances associated to the $L_\infty$ metric, there is a difference in the problem formulation. As the required modification relative to the preceding metrics has a similar structure, it will not be considered as a separate case in the following descriptions. It is sufficient to take the constraints:

$$\sum_{i=1}^{q}\sum_{i=1}^{n}\phi(\theta_\infty(s_j^l, x_i^l, \gamma) - z_j, \tau) \leq \varepsilon, j = 1, \ldots, m$$

in the place of constraints of problem (12) and to define the function $$\theta_\infty(s_j^l, x_i^l, \gamma) = \sqrt{(s_i^l - x_i^l)^2 + \gamma^2} \quad (16)$$

for $\gamma > 0$.

Function $\theta_\infty$ has the following properties:

(a)
$$\lim_{\gamma \to 0} \theta_\infty(s_j^l, x_i^l, \gamma) = |s_j - x_i|;$$

(b) $\theta_\infty$ is a $C^\infty$ function.

COMPLETELY DIFFERENTIABLE FORMULATION

By using the appropriate approximation function $\theta$ as a measure of the distance $\|s_j - x_i\|$ in accordance with Euclidian, Minkowski or Manhattan metrics, a completely differentiable problem of following type:

$$\text{minimize} \sum_{j=1}^{m} f(z_j) \quad (17)$$

$$\text{subject to: } \sum_{i=1}^{q}\phi(z_j - \theta(s_j, x_i, \gamma), \tau) \geq \varepsilon, j = 1, \ldots, m$$

is now obtained. For the Chebychev metric, a problem with similar structure is obtained.

So, the properties of functions $\phi$ and $\theta$ allow us to seek a solution to problem (10) by solving a sequence of subproblems like problem (17), produced by decreasing the parameters $\gamma \to 0$, $\tau \to 0$, $\varepsilon \to 0$.

Since $z_j \geq 0$, $j=1, \ldots, m$ the objective function minimization process will work reducing those values to the utmost. On the other hand, given any set of centroids $x_i$, $i=1, \ldots, q$ due to property (c) of the hyperbolic smoothing function $\phi$, the constraints of problem (17) are a monotonically increasing function in $z_j$. So, these constraints will certainly be active and problem (17) will at least be equivalent to the problem:

$$\text{minimize} \sum_{j=1}^{m} f(z_j) \quad (18)$$

$$\text{subject to: } h_j(z_j, x) = \sum_{i=1}^{q}\phi(z_j - \theta(s_j, x_i, \gamma), \tau) - \varepsilon = 0,$$

$$j = 1, \ldots, m$$

The dimension of the variable domain space of problem (18) is (nq+m). As, in general, the value of the parameter m, the cardinality of the set S of the observations, is large, problem (18) has a large number of variables. However, it has a separable structure because each variable $z_j$ appears only in one equality constraint. Therefore, as the partial derivative of $h_j(z_j, x)$ with respect to $z_j$, $j=1, \ldots, m$ is not equal to zero, it is possible to use the Implicit Function Theorem to calculate each component $z_j$, $j=1, \ldots, m$ as a function of the centroid variables $x_i$, $i=1, \ldots, q$. This way, the unconstrained problem $$\text{minimize} \sum_{j=1}^{m} f(z_j(x)) \qquad (19)$$

is obtained, where each $z_j(x)$ results from the calculation of a zero of each equation $$h_j(z_j, x) = \sum_{i=1}^{q} \phi(z_j - \theta(s_j, x_i, \gamma), \tau) - \varepsilon, \; j=1, \ldots, m \qquad (20)$$

Due to property (c) of the hyperbolic smoothing function, each term $\phi$ above is strictly increasing with variable $z_j$ and therefore the equation has a single zero.

Again, due to the Implicit Function Theorem, the functions $z_j(x)$ have all derivatives with respect to the variables $x_i$, $i=1, \ldots, q$ and therefore it is possible to calculate the gradient of the objective function of problem (19)

$$\nabla F(x) = \sum_{j=1}^{m} \frac{df(z_j(x))}{dz_j} \nabla z_j(x) \qquad (21)$$

where $$\nabla z_j(x) = -\nabla h_j(z_j, x) \bigg/ \frac{\partial h_j(z_j, x)}{\partial z_j} \qquad (22)$$

while $\nabla h_j(z_j, x)$ and $\partial h_j(z_j, x)/\partial z_j$ are obtained from equations (11) and (20) and the appropriate equation between (13) and (16). This way, it is easy to solve problem (19) by making use of any method based on first order derivative information. Finally, it must be emphasized that problem (19) is defined on a (nq)-dimensional space, so it is a small problem, since the number of clusters, q, is usually very small for real-world applications. The solution of the original clustering problem can be obtained by using the general Hyperbolic Smoothing Clustering (HSC) Method, described below in a simplified form:

THE HSC METHOD

Initialization Step:
Choose initial values: $x^0$, $\gamma^1$, $\tau^1$, $\varepsilon^1$
Choose values $0 < \rho_1 < 1$, $0 < \rho_2 < 1$, $0 < \rho_3 < 1$; let k=1.
Main Step: Repeat until an arbitrary stopping rule is attained
Solve problem (19) with $\gamma = \gamma^k$, $\tau = \tau^k$ and $\varepsilon = \varepsilon^k$, starting at the initial point $x^{k-1}$ and let $x^k$ be the solution obtained.
Let $\gamma^{k+1} = \rho_1 \gamma^k$, $\tau^{k+1} = \rho_2 \tau^k$, $\varepsilon^{k+1} = \rho_3 \varepsilon^k$, k=k+1•
COMMENTS:

Just as in other smoothing methods, the solution to the clustering problem is obtained, in theory, by solving an infinite sequence of optimization problems. In the HSC method, each problem that is minimized is unconstrained and of low dimension.

Notice that the general method causes $\tau$ and $\gamma$ to approach 0, so the constraints of the sub-problems it solves, given as in (17), tend to those of (10). In addition, the general method causes $\varepsilon$ to approach 0, so, in a simultaneous movement, the solved problem (10) gradually approaches problem (9).

BOUNDARY AND GRAVITATIONAL REGIONS PARTITION METHODOLOGY

The calculation of the objective function of the problem (19) demands the determination of the zeros $z_j(x)$ of m equations (20), one equation for each observation point. This is a relevant computational task associated to HSC Method.

This section presents a faster procedure for a generic clustering formulation. The basic idea is the partition of the set of observations into two non overlapping parts. By using a conceptual presentation, the first set corresponds to the observation points that are relatively close to two or more centroids. The second set corresponds to the observation points that are significantly close to a unique centroid in comparison to the other ones.

So, the first part $J_B$ is the set of boundary observations and the second one is the set $J_G$ of gravitational observations. Considering this partition, equation (19) can be calculated in the following way:

$$\text{minimize} \sum_{j=1}^{m} f(z_j) = \sum_{j \in J_B} f(z_j) + \sum_{j \in J_G} f(z_j) \qquad (23)$$

so that the objective function can be presented in the form:

$$\text{minimize } F(x) = F_B(x) + F_G(x) \qquad (24)$$

where the two components $F_B(x)$ and $F_G(x)$ are completely independent.

The proposed partition scheme has a general validity. In particular, it makes sense when there are advantageous strategies for any of the two components of the objective function. Right away, a natural connection between the hyperbolic smoothing approach and this partition scheme is presented.

The first part of expression (24), associated to the boundary observations, can be calculated by using the previous presented smoothing approach, see (19) and (20):

$$F_B(x) = \sum_{j \in J_B} f(z_j(x)) \qquad (25)$$

where each $z_j(x)$ results from the calculation of a zero of each equation $$h_j(z_j, x) = \sum_{i=1}^{q} \phi(z_j - \theta(s_j, x_i, \gamma), \tau) - \varepsilon, \; j = J_B \qquad (26)$$

The second part of expression (24) can be calculated by using a faster procedure, as will be shown right away.

Let us define the two parts in a more rigorous form. Let be $\bar{x}_i$, $i=1, \ldots, q$ be a referential position of the centroids of the clusters taken along the iterative process.

The boundary concept in relation to the referential point $\bar{x}$ can be easily specified by defining a $\delta$ band zone between neighboring centroids. For a generic point $s \in R^n$, let us define the first and second nearest distances from s to the centroids following an arbitrary metric:

$$d_1(s, \bar{x}) = \|s - \bar{x}_{i_1}\| = \min_i \|s - \bar{x}_i\| \qquad (27)$$

$$d_2(s, \bar{x}) = \|s - \bar{x}_{i_2}\| = \min_{i \neq i_1} \|s - \bar{x}_i\| \qquad (28)$$

where $i_2$ and $i_2$ are the labeling indices of these two nearest centroids.

By using the above definitions, let us define precisely the $\delta$ boundary band zone:

$$Z_\delta = \{s \in R^n | d_2(s,\bar{x}) - d_1(s,\bar{x}) < \delta\} \qquad (29)$$

and the gravitational region, which is the complementary space:

$$G_\delta(\bar{x}) = \{s \in R^n - Z_\delta(\bar{x})\} \qquad (30)$$

Figure 3:
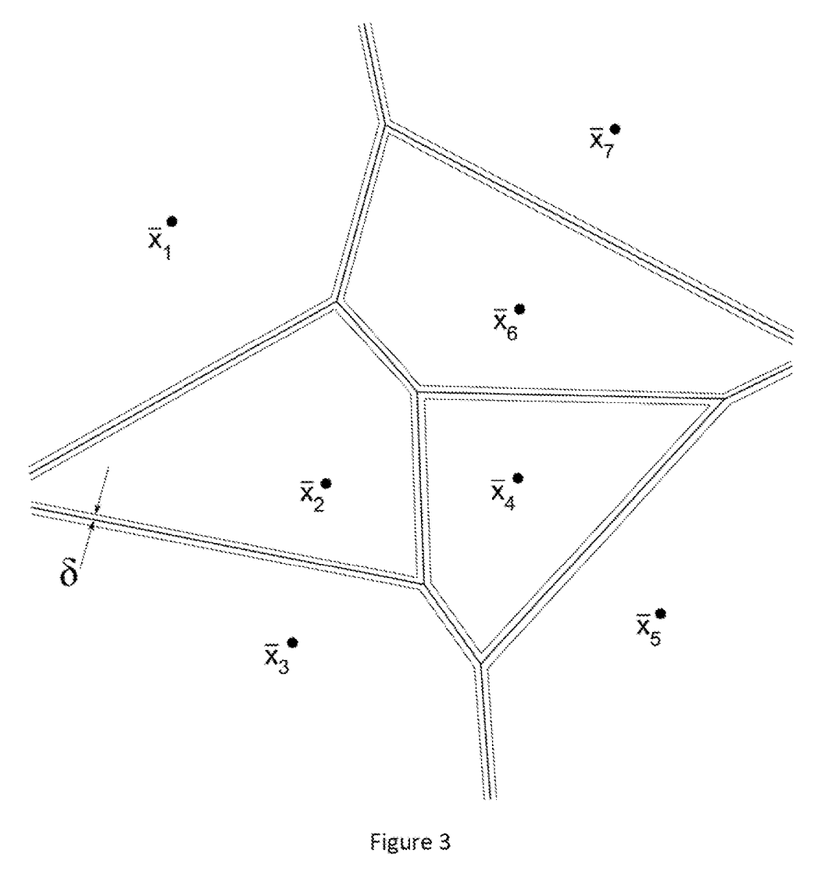
FIG. 3 is schematic view illustrating in a bi-dimensional space the $Z_\delta(\bar{x})$ and $G_\delta(\bar{x})$ partitions.

FIG. 3 illustrates in a bi-dimensional space the $Z_\delta(\bar{x})$ and $G_\delta(\bar{x})$ partitions. The central lines form the Voronoy polygon associated to the referential centroids $\bar{x}_i$, $i=1, \ldots, q$. The region between two lines parallel to Voronoy lines constitutes the boundary band zone $Z_\delta(\bar{x})$.

Now, the sets $J_B$ and $J_G$ can be defined in a precise form:

$$J_B(\bar{x}) = \{j=1, \ldots, m | s_j \in Z_\delta(\bar{x})\} \qquad (31)$$

$$J_G(\bar{x}) = \{j=1, \ldots, m | s_j \in Z_\delta(\bar{x})\} \qquad (32)$$

FIG. 3 shows the $Z_\delta(\bar{x})$ and $G_\delta(\bar{x})$ partitions

PROPOSITION 1:

Let s be a generic point belonging to the gravitational region $G_\delta(\bar{x})$, with nearest centroid $i_1$. Let x be the current position of the centroids. Let $\Delta x = \max_i \|x_i - \bar{x}_i\|$ be the maximum displacement of the centroids.

If $\Delta x < \delta$ then s will continue to be nearest to the centroid $x_{i_1}$ than to any other one, so $$\min_{i \neq i_1} \|s - x_i\| \geq \|s - x_{i_1}\| \qquad (33)$$

Since $\delta \geq \Delta x$, Proposition 1 makes it possible to calculate exactly expression (23) in a faster way. First, let us define the subsets of the gravitational observations associated to each referential centroid $\bar{x}_i, i=1, \ldots, q$:

$$J_i(\bar{x}) = \left\{ j \in J_G \,\middle|\, \min_{i=1,\ldots,q} \|s_j - \bar{x}_i\| = \|s_j - \bar{x}_i\| \right\} \qquad (34)$$

The second part of expression (24), associated to the gravitational observations, can indeed be calculated by the following straightforward form, which is much easier than the hard calculation of zeros of equations (20):

$$F_G(x) = \sum_{j \in J_G} f(z_j(x)) = \sum_{i=1}^{q} \sum_{j \in J_i(x)} f(z_j(x)) \qquad (35)$$

Therefore, if $\delta \geq \Delta x$ is observed within the iterative process, the calculation of the expression $\Sigma_{j \in J_G} f(z_j(x))$ can be exactly performed by faster procedures.

By using the above results, it is possible to construct a method, the Accelerated Hyperbolic Smoothing Clustering Method, which has conceptual properties that offer a faster computational performance for solving the clustering problem given by formulation (23).

A fundamental question is the proper choice of the boundary parameter $\delta$. Moreover, there are two main options for updating the boundary parameter $\delta$, inside the internal minimization procedure or after it. For simplicity sake, the AHSC method, the HSC method connected with the boundary and gravitational regions partition scheme presented below, adopts the second option, which can sometimes offer a better computational performance, in spite of an eventual violation of the $\delta \geq \Delta x$ condition, which is corrected in the next partition update.

THE AHSC METHOD

Initialization Step:
Choose initial start point: $x^0$;
Choose parameter values: $\gamma^1, \tau^1, \varepsilon^1$;
Choose reduction factors: $0 < \rho_1 < 1, 0 < \rho_2 < 1, 0 < \rho_3 < 1$;
Specify the boundary band width: $\delta^1$
Let $k=1$.
Main Step: Repeat until an arbitrary stopping rule is attained
  For determining the $Z_\delta(\bar{x})$ and $G_\delta(\bar{x})$ partitions, given by (29) and (30), use $\bar{x} = x^{k-1}$ and $\delta = \delta^k$.
  Solve problem (24) starting at the initial point $x^{k-1}$ and let $x^k$ be the solution obtained:
  For solving the equations (26), associated to the first part given by (25), take the smoothing parameters: $\gamma = \gamma^k, \tau = \tau^k$ and $\varepsilon = \varepsilon^k$;
  For solving the second part, given by (35), use a direct procedure considering each gravitational region separately.
  Updating procedure:
    Let $\gamma^{k+1} = \rho_1 \gamma^k, \tau^{k+1} = \rho_2 \tau^k, \varepsilon^{k+1} = \rho_3 \varepsilon^k$
    Redefine the boundary value: $\delta^{k+1}$
    Let $k := k+1 \bullet$
COMMENTS:
The above method does not include any procedure for considering the occurrence of empty clusters. This possibility can be overcome by simply moving the centroids.

The efficiency of the AHSC (HSC Method Connected with the Boundary and Gravitational Regions Partition Scheme) depends strongly on the parameter $\delta$. A choice of a small value for it will imply an improper definition of the set $G_\delta(\bar{x})$ and frequent violation of the basic condition $\Delta x < \delta$, for the validity of Proposition 1. Otherwise, a choice of a large value will imply a decrease in the number of gravitational observation points and, therefore, the computational advantages given by formulation (35) will be reduced.

As a general strategy, within first iterations, larger $\delta$ values must be used, because the centroid displacements are more expressive. The $\delta$ values must be gradually decreased in the same proportion as the decrease of these displacements.

BOUNDARY AND GRAVITATIONAL REGIONS PARTITION METHODOLOGY APPLIED TO THE EUCLIDIAN METRIC

In this section, a particular clustering problem formulation is considered. Among many criteria used in cluster analysis, the most natural, intuitive and frequently adopted criterion is the minimum sum-of-squares clustering (MSSC). This criterion corresponds to the minimization of the sum-of-squares of distances of observations to their cluster means, or equivalently, to the minimization of within-group sum-of-squares. It is a criterion for both the homogeneity and the separation objectives since, according to the Huygens Theorem, minimizing the within-cluster inertia of a partition (homogeneity within the cluster) is equivalent to maximizing the between-cluster inertia (separation between clusters).

The minimum sum-of-squares clustering (MSSC) formulation produces a mathematical problem of global optimization. It is both a nondifferentiable and a nonconvex mathematical problem, with a large number of local minimizers. It is a particular case of the general formulation (5)

$$\text{minimize} \sum_{j=1}^{m} z_j^2 \quad (36)$$

$$\text{subject to } z_j = \min_{i=1,\ldots,q} \|s_j - x_i\|_2,$$

$$j = 1, \ldots, m$$

By performing the partition of the set of observations above described into two non overlapping parts, the boundary band zone and the gravitational regions, the problem becomes:

$$\text{minimize} \sum_{j=1}^{m} z_j(x)^2 = \sum_{j \in J_B} z_j(x)^2 + \sum_{j \in J_G} z_j(x)^2 \quad (37)$$

so that the objective function can be presented in the form:

$$\text{minimize } F(x) = F_B(x) + F_G(x) \quad (38)$$

where the two components are completely independent.

The first part of expression (38), associated to the boundary observations, can be calculated by using the previous presented smoothing approach, see (19) and (20):

$$\text{minimize } F_B(x) = \sum_{j \in J_S} z_j(x)^2 \quad (39)$$

where each $z_j(x_i)$ results from the calculation of a zero of each equation $$\text{subject to } h_j(z_j, x) = \sum_{i=1}^{q} \phi(z_j - \theta_2(s_j, x_i, \gamma), \tau) - \varepsilon = 0, \quad (40)$$

$$j \in J_B$$

The second part of expression (38) can be calculated by using a faster procedure, as will be shown right away.

The center of the observations of each non-empty gravitational subset is given by $$v_i = \frac{1}{|J_i|} \sum_{s_j \in J} s_j, \quad \forall \, i = 1, \ldots, q \quad (41)$$

Let us consider the second sum of expression (37). It will be calculated taking into reference the centers above defined $$\text{minimize } F_G(x) = \sum_{j \in J_G} z_j(x)^2 = \sum_{i=1}^{q} \sum_{j \in J_i} \|s_j - x_i\|^2 = \quad (42)$$

-continued $$\sum_{i=1}^{q} \sum_{j \in J_i} \|s_j - v_i + v_i - x_i\|^2 = \quad (43)$$

$$\sum_{i=1}^{q} \left[ \sum_{j \in J_i} \|s_j - v_i\|^2 + 2(v_i - x_i) \sum_{j \in J_i} (s_j - v_i) + \sum_{j \in J_i} \|x_i - v_i\|^2 \right] \quad (44)$$

Equation (41) implies that $$\sum_{j \in J_i} (s_j - v_i) = 0, \quad (45)$$

and then:

$$\text{minimize } F_G(x) = \sum_{i=1}^{q} \sum_{j \in J_i} \|s_j - v_i\|^2 + \sum_{i=1}^{q} |J_i| \|x_i - v_i\|^2 \quad (46)$$

When the position of centroids $x_i$, $i=1, \ldots, q$ move within the iterative process, the value of the first sum of (46) assumes a constant value, since the vectors s and v are fixed. On the other hand, for the calculation of the second sum, it is only necessary to calculate q distances, $\|v_i - x_i\|$, $i=1, \ldots, q$.

The gradient of the second part objective function is easily calculated by:

$$\nabla F_G(x) = \sum_{i=1}^{q} 2|J_i|(x_i - v_i) \quad (47)$$

where the vector $(x_i - v_i)$ must be taken in $R^{nq}$, so it has the first $(i-1)q$ components and the last $l=iq+1, \ldots, nq$ components equal zero.

Therefore, if $\delta \geq \Delta x$ is observed within the iterative process, the calculation of the expression $\Sigma_{j \in J_G} z_j(x)^2$ and its gradient can be exactly performed by very fast procedures, equations (46) and (47).

By using the above results, it is possible to construct a specific method, the Accelerated Hyperbolic Smoothing Clustering Method Applied to the Minimum Sum-Of-Squares Clustering (MSSC) Formulation, which has conceptual properties that offer a faster computational performance for solving the clustering problem given by formulation (37), since the calculation of the second sum is very simple.

A fundamental question is the proper choice of the boundary parameter $\delta$. Moreover, there are two main options for updating the boundary parameter $\delta$, inside the internal minimization procedure or after it. For simplicity sake, the AHSC-L2 method, the AHSC method specialized for the MSSC formulation, presented below adopts the second option, which can sometimes offer a better computational performance, in spite of an eventual violation of the $\delta \geq \Delta x$ condition, which is corrected in the next partition update.

THE AHSC-L2 METHOD

Initialization Step:
Choose initial start point: $x^0$;
Choose parameter values: $\gamma^1$, $\tau^1$, $\varepsilon^1$;
Choose reduction factors: $0<\rho_1<1$, $0<\rho_2<1$, $0<\rho_3<1$;
Specify the boundary band width: $\delta^1$
Let k=1.
Main Step: Repeat until an arbitrary stopping rule is attained For determining the $Z_\delta(\bar{x})$ and $G_\delta(\bar{x})$ partition, given by (29) and (30), use $\bar{x}=x^{k-1}$ and $\delta=\delta^k$.

Calculate the centers $v_i$=1, . . . , q of gravitational regions by using (41).

Solve problem (38) starting at the initial point $x^{k-1}$ and let $x^k$ be the solution obtained:

For solving the equations (40), associated to the first part given by (39), take the smoothing parameters: $\gamma=\gamma^k$, $\tau=\tau^k$ and $\varepsilon=\varepsilon^k$;

For solving the second part, given by (46), use the above calculated centers of the gravitational regions.
Updating procedure:
Let $\gamma^{k+1}=\rho_1\gamma^k$, $\tau^{k+1}=\rho_2\tau^k$, $\varepsilon^{k+1}=\rho_3\varepsilon^k$;
Redefine the boundary value: $\delta^{k+1}$;
Let k:=k+1•
COMMENTS:
The above method does not include any procedure for considering the occurrence of empty clusters. This possibility can be overcome by simply moving the centroids.

The efficiency of the AHSC-L2 (HSC Method Connected with the Boundary and Gravitational Regions Partition Scheme Applied to the Minimum Sum-of-Squares Clustering (MSSC) formulation)) depends strongly on the parameter $\delta$. A choice of a small value for it will imply an improper definition of the set $G_\delta(\bar{x})$ and frequent violation of the basic condition $\Delta x<\delta$, for the validity of Proposition 1. Otherwise, a choice of a large value will imply a decrease in the number of gravitational observation points and, therefore, the computational advantages given by formulation (46) will be reduced.

As a general strategy, within first iterations, larger $\delta$ values must be used, because the centroid displacements are more expressive. The $\delta$ values must be gradually decreased in the same proportion as the decrease of these displacements.

COMPUTATIONAL RESULTS

The computational results presented below were obtained from a preliminary implementation of the Accelerated Hyperbolic Smoothing Clustering Applied to the MSSC formulation by the AHSC-L2 method. The numerical experiments have been carried out on a PC Intel Celeron with 2.7 GHz CPU and 512 MB RAM. The programs are coded with Compac Visual FORTRAN, Version 6.1. The unconstrained minimization tasks were carried out by means of a Quasi-Newton algorithm employing the BFGS updating formula from the Harwell Library, obtained in the site: (http://www.cse.scitech.ac.uk/nag/hsl/).

In order to show the distinct performance of the AHSC-L2 Method, results obtained by solving a set of the largest problems of the TSP collection are shown below (http://www.iwr.uni-heidelberg.de/groups/comopt/software).

Table 1 presents the results for the TSPLIB-3038 data set. It exhibits the results produced by AHSC-L2 Method and, for comparison, those of two very fast algorithms presented by Bagirov in "Modified Global k-means Algorithm for Minimum Sum-of-Squares Clustering Problems", Pattern Recognition, Vol 41 Issue 10 pp 3192-3199, 2008. The first two columns show the number of clusters (q) and the best known value for the global optimum ($f_{opt}$) taken from Bagirov (2008). The next columns show the deviation (E) for the best solution produced ($f_{Best}$) and the mean CPU time (Time) given in seconds associated to three algorithms: multi-start k-means (MS k-is means), modified global k-means (MGKM) and the proposed AHSM-L2. The deviations are calculated in the following way: $E=100(f_{Best}-f_{opt})/f_{opt}$.

The multi-start k-means or MS k-means algorithm is the traditional k-means algorithm with multiple initial starting points. In this experiment, to find q clusters, 100 times q starting points were randomly chosen in the MS k-means algorithm. The global k-means (GKM) algorithm, introduced by A. Likas, M. Vlassis and J. Verbeek in "The Global k-means Clustering Algorithm", Pattern Recognition, Vol 36 pp 451-461, 2003, is a significant improvement of the k-means algorithm. The MGKM is an improved version of the GKM algorithm proposed by Bagirov(2008). The AHSM-L2 solutions were produced by using 10 starting points in all cases, except q=40 and q=50, where 20 and 40 starting points were taken, respectively.

TABLE 1

Results for the TSPLIB-3038 Instance

| | | MS k-means | | MGKM | | AHSC-L2 | |
|---|---|---|---|---|---|---|---|
| q | $f_{opt}$ | E | Time | E | Time | E | Time |
| 2 | 0.31688E10 | 0.00 | 12.97 | 0.00 | 0.86 | 0.05 | 0.07 |
| 10 | 0.56025E09 | 0.00 | 11.52 | 0.58 | 3.30 | 0.01 | 0.28 |
| 20 | 0.26681E09 | 0.42 | 14.53 | 0.48 | 5.77 | 0.05 | 0.59 |
| 30 | 0.17557E09 | 1.16 | 19.09 | 0.67 | 8.25 | 0.31 | 0.86 |
| 40 | 0.12548E09 | 2.24 | 22.28 | 1.35 | 10.70 | −0.11 | 1.09 |
| 50 | 0.98400E08 | 2.60 | 23.55 | 1.41 | 13.23 | 0.44 | 1.36 |
| 60 | 0.82006E08 | 5.56 | 27.64 | 0.98 | 15.75 | −0.80 | 1.91 |
| 80 | 0.61217E08 | 4.84 | 30.02 | 0.63 | 20.94 | −0.73 | 6.72 |
| 100 | 0.48912E08 | 5.99 | 33.59 | 0.00 | 26.11 | −0.60 | 9.79 |

It is possible to observe in each row of Table 1 that the best solution produced by the new AHSC-L2 Method becomes significantly smaller than that by the MS k-means when the number of clusters q increases. In fact, algorithms of the k-means family depend strongly on the starting point and do not perform well for big instances, despite being among the most used. X. Wu et alli in "Top 10 algorithms in data mining", Knowledge and Information Systems, Springer, 14, pp 1-37, 2008 present the top 10 data mining algorithms identified by the IEEE International Conference on Data Mining in December 2006. The k-means assumes the second place in this list. Also in Table 1, the comparison between AHSC-L2 and MGKM solutions demonstrates a similar superiority of the proposed algorithm. The same way, the comparison of the time columns shows a consistent speed advantage of the proposed algorithm over the older ones.

On the other hand, the best solution produced by the AHSC-L2 Method is very close to the putative global minimum, the best known solution of the TSPLIB-3038 instance. Moreover, in this experiment, by using a relatively small number of initial starting points, four new putative global minima results (q=40, q=60, q=80 and q=100) have been established.

TABLE 2

Results for the Pla85900 Instance

| q | $f_{Calculated}$ | HSC | | | AHSC-L2 | | |
|---|---|---|---|---|---|---|---|
| | | Occur. | $E_{Mean}$ | $Time_{Mean}$ | Occur. | $E_{Mean}$ | $Time_{Mean}$ |
| 2 | 0.37491E16 | 4 | 0.86 | 23.07 | 5 | 0.58 | 3.65 |
| 3 | 0.22806E16 | 10 | 0.00 | 47.41 | 7 | 0.04 | 4.92 |
| 4 | 0.15931E16 | 10 | 0.00 | 76.34 | 10 | 0.00 | 5.76 |
| 5 | 0.13397E16 | 1 | 0.80 | 124.32 | 1 | 1.35 | 7.78 |
| 6 | 0.11366E16 | 8 | 0.12 | 173.44 | 2 | 1.25 | 7.87 |
| 7 | 0.97110E15 | 4 | 0.42 | 254.37 | 1 | 0.87 | 9.33 |
| 8 | 0.83774E15 | 8 | 0.55 | 353.61 | 4 | 0.37 | 12.96 |
| 9 | 0.74660E15 | 3 | 0.68 | 438.71 | 1 | 0.25 | 13.00 |
| 10 | 0.68294E15 | 4 | 0.29 | 551.98 | 3 | 0.46 | 14.75 |

Table 2 presents the results for the Pla85900 data set. Ten different randomly chosen starting points were used. The first column presents the specified number of clusters (q). The second column presents the best objective function value ($f_{Calculated}$) produced by the HSC Method and by the AHSC-L2 Method, both alternatives obtaining the same results within a 5 decimal digits precision. The following three columns give the particular data associated to the original HSC Method: the number of occurrences of the best solution, the average deviation of the 10 solutions ($E_{Mean}$) in relation to the best solution obtained and CPU mean time given in seconds. The last three columns give the same data associated to the new AHSC-L2 Algorithm.

The results presented in Table 2 show a coherent performance of both algorithms. It was impossible to find any record of solutions of this instance. Indeed, the clustering literature seldom considers instances with such high number of observations. The high number of occurrences of the best solution (Occur.) and the low values presented in columns ($E_{Mean}$) show a consistent performance of both algorithms. The principal issue, the comparison between the mean CPU time values, shows clearly the extra performance of the new proposed AHSC-L2 Method resulting from the very fast procedures associated to equations (46) and (47), providing speed-ups up to 37.4 times faster (q=10).

Table 3 presents the computational results produced by the AHSC-L2 Method for the largest instances of Symmetric Traveling Salesman Problem (TSPLIB) collection: FL3795, FNL4461, RL5915, RL5934, Pla7397, RL11849, USA13509, BRD14051, D15112, BRD18512 and Pla33810. For each instance, two cases are presented: q=5 and q=10. Ten different randomly chosen starting points were used. For each case, the table presents: the best objective function value produced by the AHSC-L2 Method ($f_{AHSC-L2_{Best}}$), the average deviation of the 10 solutions in relation to the best solution obtained ($E_{Mean}$) and CPU mean time given in seconds ($Time_{Mean}$).

TABLE 3

Results for larger instances of the TSPLIB collection

| Instance | q = 5 | | | q = 10 | | |
|---|---|---|---|---|---|---|
| | $f_{AHSC-L2_{Best}}$ | $E_{Mean}$ | $Time_{Mean}$ | $f_{AHSC-L2_{Best}}$ | $E_{Mean}$ | $Time_{Mean}$ |
| FL3795 | 0.368283E09 | 6.18 | 0.18 | 0.106394E09 | 2.30 | 0.26 |
| FNL4461 | 0.181667E10 | 0.43 | 0.31 | 0.853304E09 | 0.36 | 0.52 |
| RL5915 | 0.379585E11 | 1.01 | 0.45 | 0.187794E11 | 0.41 | 0.74 |
| RL5934 | 0.393650E11 | 1.69 | 0.39 | 0.191761E11 | 2.35 | 0.76 |
| Pla7397 | 0.506247E14 | 1.94 | 0.34 | 0.243486E14 | 2.10 | 0.80 |
| RL11849 | 0.809552E11 | 1.11 | 0.83 | 0.369192E11 | 0.53 | 1.55 |
| USA13509 | 0.329511E14 | 0.01 | 1.01 | 0.149816E14 | 1.39 | 1.69 |
| BRD14051 | 0.122288E11 | 1.20 | 0.82 | 0.593928E10 | 1.17 | 2.00 |
| D15112 | 0.132707E12 | 0.00 | 0.88 | 0.644901E11 | 0.71 | 2.27 |
| BRD18512 | 0.233416E11 | 1.30 | 1.25 | 0.105912E11 | 1.05 | 2.24 |
| Pla33810 | 0.335680E15 | 0.22 | 3.54 | 0.164824E15 | 0.68 | 5.14 |

It was impossible to perform a comparison, given the lack of records of solutions of these instances. Indeed, the clustering literature seldom considers instances with such high number of observations. Remark: the low values presented in columns ($E_{Mean}$) show a consistent performance of the proposed AHSC-L2 method.

BOUNDARY AND GRAVITATIONAL REGIONS PARTITION METHODOLOGY APPLIED TO THE SUM OF MANHATTAN DISTANCES CLUSTERING FORMULATION

In this section, a faster procedure for the minimum sum of distances formulation is presented, where the L1 metric appears in the distance specification. It is a particular case of the general formulation (5):

$$\text{minimize} \sum_{j=1}^{m} z_j \qquad (49)$$

$$\text{subject to } z_j = \min_{i=1,\ldots,q} \|s_j - x_i\|_1, \, j = 1, \ldots, m$$

The same way, the basic idea of the partition of the set of observations 49, into two non overlapping parts will be used, since the results of Proposition 1 are valid for any metric. Considering the same partition scheme, the objective function of problem (49) can be expressed in the separate form:

$$\text{minimize} \sum_{j=1}^{m} z_j(x) = \sum_{j \in J_B} z_j(x) + \sum_{j \in J_G} z_j(x) \quad (50)$$

so that the objective function can be presented in the form:

$$\text{minimize } F(x) = F_B(x) + F_G(x) \quad (51)$$

where the two components are completely independent.

The first part of expression (50), associated to the boundary observations, can be calculated by using the previously presented smoothing approach, as in (19) and (20):

$$F_B(x) = \sum_{j \in J_B} z_j(x), \quad (52)$$

where each $z_j(x)$ results from the calculation of a zero of each equation $$h_j(z_j, x) = \sum_{i=1}^{q} \phi(z_j - \theta_1(s_j, x_i, \gamma), \tau) - \varepsilon = 0, \ j \in J_B \quad (53)$$

The second part of expression (51) can be calculated by using a faster procedure, as will be shown right away. Let again $\bar{x}_i$, $i=1, \ldots, q$ be a referential position of centroids of the clusters taken in the iterative process used for performing the partition.

First, let us define the subsets of gravitational observations associated to each referential centroid:

$$J_i(\bar{x}) = \left\{ j \in J_G \ \bigg| \ \min_{i=1 \ldots q} \|s_j - \bar{x}_i\|_1 = \|s_j - \bar{x}_i\|_1 \right\} \quad (54)$$

Let us consider the second sum of expression (50).

$$F_G(x) = \sum_{j \in J_G} z_i(x) = \sum_{i=1}^{q} \sum_{j \in J_i} \|s_j - x_i\|_1 = \quad (55)$$

$$\sum_{i=1}^{q} \sum_{j \in J_i} \sum_{l=1}^{n} |s_j^l - x_i^l| = \quad (56)$$

$$\sum_{i=1}^{q} \sum_{l=1}^{n} \sum_{j \in J_i} |s_j^l - x_i^l| \quad (57)$$

Let us now perform the partition of each set $J_i$ into 3 subsets for each component in the following form:

$$J_{il}^+(\bar{x}) = \{ j \in J_i(\bar{x}) \ | \ s_j^l - \bar{x}_i^l \geq \delta \} \quad (58)$$

$$J_{il}^-(\bar{x}) = \{ j \in J_i(\bar{x}) \ | \ s_j^l - \bar{x}_i^l \leq -\delta \} \quad (59)$$

$$J_{il}^0(\bar{x}) = \{ j \in J_i(\bar{x}) \ | \ -\delta < s_j^l - \bar{x}_i^l < +\delta \} \quad (60)$$

By using the defined subsets, it is obtained:

$$F_G(x) = \sum_{i=1}^{q} \sum_{l=1}^{n} \left[ \sum_{j \in J_{il}^+} |s_j^l - x_i^l| + \sum_{j \in J_{il}^-} |s_j^l - x_i^l| + \sum_{j \in J_{il}^0} |s_j^l - x_i^l| \right] =$$

$$\sum_{i=1}^{q} \sum_{l=1}^{n} \left[ \sum_{j \in J_{il}^+} |s_j^l - \bar{x}_i^l + \bar{x}_i^l - x_i^l| + \sum_{j \in J_{il}^-} |s_j^l - \bar{x}_i^l + \bar{x}_i^l - x_i^l| + \sum_{j \in J_{il}^0} |s_j^l - x_i^l| \right]$$

Let us define the component displacement of centroid $\Delta x_i^l = x_i^l - \bar{x}_i^l$. Since $|\Delta x_i^l| < \delta$, from the above definitions of the subsets, it follows that:

$$|s_j^l - x_i^l| = |s_j^l - \bar{x}_i^l| - \Delta x_i^l \text{ for } j \in J_{il}^+ \quad (61)$$

$$|s_j^l - x_i^l| = |s_j^l - \bar{x}_i^l| + \Delta x_i^l \text{ for } j \in J_{il}^-$$

So, it follows:

$$\text{minimize } F_G(x) = \quad (62)$$

$$\sum_{i=1}^{q} \sum_{l=1}^{n} \left[ \sum_{j \in J_{il}^+} (|s_j^l - \bar{x}_i^l| - \Delta x_i^l) + \sum_{j \in J_{il}^-} (|s_j^l - \bar{x}_i^l| - \Delta x_i^l) + \right.$$

$$\left. \sum_{j \in J_{il}^0} |s_j^l - x_i^l| \right] = \sum_{i=1}^{q} \sum_{l=1}^{n} \left[ \sum_{j \in J_{il}^+} |s_j^l - \bar{x}_i^l| - \right.$$

$$\left. |J_{il}^+| \Delta x_i^l + \sum_{j \in J_{il}^-} |s_j^l - \bar{x}_i^l| + |J_{il}^-| \Delta x_i^l + \sum_{j \in J_{il}^0} |s_j^l - x_i^l| \right]$$

where $|J_{il}^+|$ and $|J_{il}^-|$ are the cardinalities of two first subsets.

When the position of the centroids x moves within the iterative process, the value of the first two sums of (62) assumes a constant value, since the values $s_j^l$ and $\bar{x}_i^l$ are fixed. So, to evaluate $F_G(x)$ it is only necessary to calculate the displacements $\Delta x_i^l$, $l=1, \ldots, n; i=1, \ldots, q$, and evaluate the last sum, that normally has only a few number of terms because $\delta$ assumes in general a relatively small value.

The function $F_G(x)$ above specified is nondifferentiable due the last sum, so in order to use gradient information, it is necessary to use a smooth approximation.

$$\text{minimize } F_G(x) = \sum_{i=1}^{q} \sum_{l=1}^{n} \left[ \sum_{j \in J_{il}^+} |s_j^l - \bar{x}_i^l| - \right. \quad (63)$$

$$\left. |J_{il}^+| \Delta x_i^l + \sum_{j \in J_{il}^-} |s_j^l - \bar{x}_i^l| + |J_{il}^-| \Delta x_i^l + \sum_{j \in J_{il}^0} \theta(s_j^l, x_i^l, \gamma) \right],$$

where $\theta(s_j^l, x_i^l, \gamma) = \sqrt{(s_j^l - x_i^l)^2 + \gamma^2}$.

So, the gradient of the smoothed second part of objective function is easily calculated by:

$$\nabla f_G(x) = \sum_{i=1}^{q} \sum_{l=1}^{n} \left[ -|J_{il}^+| + |J_{il}^-| + \sum_{j \in J_{il}^0} -(s_j^l - x_i^l)/\theta(s_j^l, x_i^l, \gamma) \right] e_{il}; \quad (64)$$

where $e_{il}$ stands for a unitary vector with the component l of centroid i equal to 1.

Therefore, if $\delta \geq \Delta x$ was observed within the iterative process, the calculation of the expression $\Sigma_{j \in J_G} z_j(x)$ and its gradient can be exactly performed by very fast procedures, equations (63) and (64).

By using the above results, it is possible to construct a specific method, the Accelerated Hyperbolic Smoothing Clustering Method Applied to the Manhattan Metric, which has conceptual properties that offer a faster computational performance for solving the clustering problem given by formulation (50), since the calculation of the second sum is very simple.

A fundamental question is the proper choice of the boundary parameter $\delta$. Moreover, there are two main options for updating the boundary parameter $\delta$, inside the internal minimization procedure or after it. For simplicity sake, the AHSC-L1 method, the AHSC method specialized for the sum of Manhattan distances formulation, connected with the partition scheme presented below adopts the second option, which can sometimes offer a better computational performance, in spite of an eventual violation of the $\delta \geq \Delta x$ condition, which is corrected in the next partition update.

THE AHSC-L1 METHOD

Initialization Step:
Choose initial start point: $x^0$;
Choose parameter values: $\gamma^1, \tau^1, \varepsilon^1$;
Choose reduction factors: $0 < \rho_1 < 1$, $0 < \rho_2 < 1$, $0 < \rho_3 < 1$;
Specify the boundary band width: $\delta^1$
Let k=1.
Main Step: Repeat until an arbitrary stopping rule is attained
    For determining the $Z_\delta(\bar{x})$ and $G_\delta(\bar{x})$ partition, given by (29) and (30), use $\bar{x}=x^{k+1}$ and $\delta=\delta^k$.
    Determine the subsets $J_{il}^+$, $J_{il}^-$ and $J_{il}^0$ and calculate the cardinalities of two first sets: $|J_{il}^+|$ and $|J_{il}^-|$.
    Solve problem (51) starting at the initial point $x^{k-1}$ and let $x^k$ be the solution obtained.
    For solving the equations (53), associated to the first part given by (52), take the smoothing parameters: $\gamma=\gamma^k$, $\tau=\tau^k$ and $\varepsilon=\varepsilon^k$;
    For solving the second part, given by (63), use the above determined subsets and their cardinalities.
Updating procedure:
    Let $\gamma^{k+1}=\rho_1\gamma^k$, $\tau^{k+1}=\rho_2\tau^k$, $\varepsilon^{k+1}=\rho_3\varepsilon^k$,
    Redefine the boundary value: $\delta^{k+1}$
    Let k:=k+1•
COMMENTS:
The above method does not include any procedure for considering the occurrence of empty clusters. This possibility can be overcome by simply moving the centroids.

The efficiency of the AHSC-L1 (HSC Method Connected with the Boundary and Gravitational Regions Partition Scheme Applied to the Manhattan Metric) depends strongly on the parameter $\delta$. A choice of a small value for it will imply an improper definition of the set $G_\delta(\bar{x})$ and frequent violation of the basic condition $\Delta x < \delta$, for the validity of Proposition 1. Otherwise, a choice of a large value will imply a decrease in the number of gravitational observation points and, therefore, the computational advantages given by formulation (63) will be reduced.

As a general strategy, within first iterations, larger $\delta$ values must be used, because the centroid displacements are more expressive. The $\delta$ values must be gradually decreased in the same proportion as the decrease of these displacements.

HYPERBOLIC SMOOTHING MINIMUM DISTANCE

The minimum distance of a given point to a set of points in a Euclidian multidimensional space is a common component in a broad class of mathematical problems.

In the clustering problem presentation, it was shown that for each observation point $s_j$ of the set S, we must calculate the distance $z_j$ from $s_j$ to the nearest centroid:

$$z_i = \min_{x_i \in X} \|s_j - x_i\|, \tag{65}$$

where $\|s_j - x_i\|$ is the distance following an arbitrary metric.

The kernel component of the General Hyperbolic Smoothing Clustering Methodology is to use a hyperbolic smoothing approximation $z_j(x)$, or Hyperbolic Smoothing Minimum Distance, obtained from the calculation of the zero of each function $$h_j(z_i, x) = \sum_{i=1}^{q} \phi(z_j - \theta(s_j, x_i, \gamma), \tau) - \varepsilon, \tag{66}$$

$$j = 1, \ldots, m.$$

The calculation of the minimum distance is a sub-problem that exists in a broad class of problems, not only in clustering. The calculation in the original form is nondifferentiable and presents strong numerical difficulties. On the other side, the Hyperbolic Smoothing Minimum Distance offers a $C^\infty$ differentiable approximation. The HSC Method is based on the solution of a sequence of problems obtained by a gradual decreasing of the parameters $\tau$, $\varepsilon$, and $\gamma$ to 0. A similar approach is a general strategy for solving all problems belonging to this class.

Moreover, any calculation of a minimum (or a maximum) value of a set of functions can be reduced to an equivalent task. Let us consider:

$$w(x) = \min_i (t_i(x)), \tag{67}$$

where $t_i(x), i=1, \ldots, q$ are arbitrary functions. In a similar way, a hyperbolic smoothing approximation of w can be obtained from the calculation of the zero of the function $$h(w, x) = \sum_{i=1}^{q} \phi(w - t_i(x), \tau) - \varepsilon = 0. \tag{68}$$

By using the Implicit Function Theorem, the gradient is obtained:

$$\nabla w(x) = -\nabla h(w, x) \bigg/ \frac{\partial h_j(w, x)}{\partial w}. \tag{69}$$

A short list of other potential problems involving minimum distance or minimum value calculations is presented below:
Min-max problems;
Min-max-min problems;
Min-sum-min problems;

Covering a plane region by circles;
Covering a tridimensional body by spheres;
  Gamma knife problem
Location problems;
  Facilities location problems;
  Hub and spike location problems;
  Steiner problems;
  Minisum and minimax location problems;
Districting problems;
Packing problems;
Scheduling problems;
Geometric distance problems;
  Protein folding problems;
Spherical point arrangements problems;
  Elliptic Fekete problem;
  Fekete problem;
  Power sum problem;
  Tammes (Hard-spheres) problem.

In short, any problem having components described by expressions similar to equation (67) can be smoothed by using the Hyperbolic Smoothing Minimum Distance procedure so that the original problem can be solved by the gradual decreasing of the parameters following the same intrinsic idea as in the Hyperbolic Smoothing General Clustering Methodology.

The steps of the methods described herein may be embodied directly in hardware, in a software module executed by a processor, or in a combination of the two. A software module that implements the proposed methodology may reside in several types of memory, such as RAM, ROM and others, in computer registers, in a hard disk, a CD-ROM, or any other form of storage medium known in the art. A storage medium could be coupled to a processor such that the processor can read information from, and write information to, the storage medium. In an alternative implementation, the storage medium may be integral to the processor.

While the above description has described the features of the invention as applied to various possible software and hardware embodiments, it will be understood that various omissions, substitutions, and changes in the form and details of the process described may be made by those skilled in the art without departing from the spirit of the invention. The present invention may be implemented in such a way that it does not provide all of the features and benefits set forth herein, as some features may be used or practiced separately from others. The scope of the invention is indicated by the appended Claims rather than by the foregoing description. All changes which come within the meaning and range of equivalency of the claims are to be embraced within their scope.

The invention claimed is:

1. A non-transitory computer readable medium storing a program causing a computer including a processor and a memory, to execute a method of data mining by optimizing the clustering of a given set of m observations $s_j$, $j=1, \ldots, m$, each represented by n components, into a specified number of groups q, represented by a set of centroids $x_i$, $i=1, \ldots, q$, following a criterion of minimizing the sum of the values of a monotonic increasing function f applied to each argument $z_j$, defined as the shortest distance from each generic observation $s_j$ to the nearest centroid, according to a general optimization formulation:

$$\text{minimize } F(x) = \sum_{j=1}^{m} f(z_j)$$

$$\text{subject to: } z_j = \min_{x_i \in X} \|s_j - x_i\|, j = 1, \ldots, m,$$

where $x=(x_1, x_2, \ldots, x_q) \in R^{nq}$ and $f(z_j)$ is an arbitrary monotonic increasing function f applied to the distance $z_j$ measured following one of four different metrics, namely Euclidian norm, Minkowski norm, Manhattan norm and Chebychev norm, the method comprising the steps of:
  performing an initialization step that includes choosing the first initial starting point $x^0$, choosing smoothing parameter values $\gamma, \tau, \varepsilon$ and specifying a boundary band width parameter $\delta$;
  performing an iterative procedure until an arbitrary stopping rule is attained, with a counter of iterations k, initialized with a value of 1, comprises the steps of:
    splitting the set of observations into two non-overlapping parts: the first set $J_B$ corresponds to the observations that are relatively close to two or more centroids based on the boundary band width parameter $\delta$, and the second set $J_G$ corresponds to the observations that are significantly close to a unique centroid in comparison to the other ones, then:

$$F(x) = F_B(x) + F_G(x) = \sum_{j \in J_B} f(z_j) + \sum_{j \in J_G} f(z_j);$$

solving an optimization problem;
  determining the q hard clustering;
  determining membership levels of each observation to each particular cluster within a fuzzy clustering referential; and
  updating the smoothing parameters $\gamma, \tau, \varepsilon$ and the boundary band width parameter $\delta$; and
visually outputting the optimized clustering of the set of observations into groups represented by the set of centroids $x_i$ using the computer.

2. The non-transitory computer readable medium of claim 1 wherein the step of solving an optimization problem consists of solving a completely differentiable unconstrained optimization problem:

$$\text{minimize } F(x) = \sum_{j=1}^{m} f(z_j),$$

starting at the initial starting point $x^{k-1}$ and obtaining an optimal solution x* used as the next starting point $x^k$, where the calculation of the objective function and its gradient is performed in two independent procedures:
  performing the calculation of the first part associated to the boundary band zone; and
  performing the calculation of the second part associated to the gravitational regions.

3. The non-transitory computer readable medium of claim 2 wherein the procedure for calculation of the first part of the objective function and its gradient, associated to the boundary band zone, consists of calculations $$F_B = \sum_{j \in J_B} f(z_j(x))$$

where each $z_j(x)$ results from the calculation of the zero of a general smooth equation $$h_j(z_j,x)=0,\ j\in J_B$$

which assumes a particular smoothing procedure for each considered metric: Euclidian, Minkowski, Manhattan and Chebychev, and where the gradient of this part of the objective function can always be exactly calculated by the expression $$\nabla F_B(x) = \sum_{j \in J_B} \frac{df(z_j(x))}{dz_j} \nabla z_j(x)$$

where $$\nabla z_j(x) = -\nabla h_j(z_j, x) \Big/ \frac{\partial h_j(z_j, x)}{\partial z_j}.$$

4. The non-transitory computer readable medium of claim 3 wherein the smoothing procedure for the case of the Euclidian metric considers the general smooth equation under the particular form:

$$h_j(z_j, x) = \sum_{i=1}^{q} \phi(z_j - \theta_2(s_j, x_i, \gamma), \tau) - \varepsilon = 0,\ j \in J_B,$$

where $\phi(y, \tau) = \left(y + \sqrt{y^2 + \tau^2}\right)/2$ and $$\theta_2(s_j, x_i, \gamma) = \sqrt{\sum_{i=1}^{n} (s_j^i - x_i^i)^2 + \gamma^2}.$$

5. The non-transitory computer readable medium of claim 3 wherein the smoothing procedure for the Minkowski metric considers the general smooth equation under the particular form:

$$h_j(z_j, x) = \sum_{i=1}^{q} \phi(z_j - \theta_p(s_j, x_i, \gamma), \tau) - \varepsilon = 0,\ j \in J_B,$$

where $\phi(y, \tau) = \left(y + \sqrt{y^2 + \tau^2}\right)/2$ and $$\theta_p(s_j, x_i, \gamma) = \left(\sum_{i=1}^{n} (s_j^i - x_i^i)^p + \gamma^p\right)^{1/p}.$$

6. The non-transitory computer readable medium of claim 3 wherein the smoothing procedure for the Manhattan metric considers the general smooth equation under the particular form:

$$h_j(z_j, x) = \sum_{i=1}^{q} \phi(z_j - \theta_1(s_j, x_i, \gamma), \tau) - \varepsilon = 0,\ j \in J_B,$$

where $\phi(y, \tau) = \left(y + \sqrt{y^2 + \tau^2}\right)/2$ and $$\theta_1(s_j, x_i, \gamma) = \sum_{i=1}^{n} \sqrt{(s_j^i - x_i^i)^2 + \gamma^2}.$$

7. The non-transitory computer readable medium of claim 3 wherein the smoothing procedure for the Chebychev metric considers the general smooth equation under the particular form:

$$h_j(z_j, x) = \sum_{i=1}^{q} \sum_{i=1}^{n} \phi(\theta_\infty(s_j^i, x_i^i, \gamma) - z_j, \tau) - \varepsilon = 0,\ j = 1, \ldots, m,$$

where $\phi(y, \tau) = \left(y + \sqrt{y^2 + \tau^2}\right)/2$ and $$\theta_\infty(s_j^i, x_i^i, \gamma) = \sqrt{(s_j^i - x_i^i)^2 + \gamma^2}.$$

8. The non-transitory computer readable medium of claim 2 wherein the procedure for calculation of the second part of the objective function and its gradient, associated to the gravitational regions, is indeed performed by the following straightforward form $$F_G = \sum_{j \in J_G} f(z_j),$$

$$\nabla F_G = \sum_{j \in J_G} \nabla f(z_j),$$

where $z_j = \|s_j - x_{i(j)}\|,\ j = 1, \ldots, m$, and $i(j)$ represents the index of the gravitational region to which observation j belongs.

9. The non-transitory computer readable medium of claim 1 wherein the step of determining the q hard clustering consists of calculating the set of q hard clusters, $C_i$, $i=1,\ldots,q$, where each cluster $C_i$ at each iteration k is formed by the set of observations for which the closest centroid is $x_i^*$;

the step of determining membership levels $p_{ij}$ of each observation j to each particular cluster i within a fuzzy clustering referential consists of calculating at each iteration k values $p_{ij}$ by the expression $$p_{ij} = g(v_{ij}/\varepsilon) \Big/ \sum_{i=1}^{q} g(v_{ij}/\varepsilon),\ j = 1, \ldots, m,\ i = 1, \ldots, q,$$

where $g:R \to R$, $g(0)=0$, $g(1)=1$ is an arbitrary monotonic crescent function and $v_{ij}$ is the contribution of centroid i to the general smooth equation associated to observation j that assumes the common form: $v_{ij}=\phi(z_j-\theta(s_j,x_i^*,\gamma),\tau)$ for the Euclidian, Minkowski and Manhattan cases; and the step of updating the smoothing parameters consists of any manipulation procedure of parameters $\varepsilon$, $\tau$, $\gamma$, including the most traditional decreasing of the three parameters to zero in order to gradually approach the original problem formulation.

10. A non-transitory computer readable medium storing a program causing a computer including a processor and a memory, to execute a method of data mining by optimizing the clustering of a given set of m observations $s_j$, $j=1,\ldots,m$, each represented by n components, into a specified number of groups q, represented by a set of centroids $x_i$, $i=1,\ldots,q$, following the criterion of minimizing the sum of squares of Euclidian distances $z_j$, defined as the shortest distance from each generic observation $s_j$ to the nearest centroid, according to the optimization formulation:

$$\text{minimize } F(x) = \sum_{j=1}^{m} (z_j)^2$$

$$\text{subject to: } z_j = \min_{x_i \in X} \|s_j - x_i\|_2,\ j = 1, \ldots, m,$$

where $x=(x_1, x_2, \ldots, x_q) \in R^{nq}$, comprising the steps of:
  performing an initialization step that includes choosing the first initial starting point $x^0$, choosing smoothing parameter values $\gamma, \tau, \varepsilon$ and specifying a boundary band width parameter $\delta$;
  performing an iterative procedure until an arbitrary stopping rule is attained, with a counter of iterations k, initialized with a value of 1, comprises the steps of:
    splitting the set of observations into two non-overlapping parts: the first set $J_B$ corresponds to the observations that are relatively close to two or more centroids based on the boundary band width parameter $\delta$, and the second set $J_G$ corresponds to the observations that are significantly close to a unique centroid in comparison to the other ones, then:
    $F(x)=F_B(x)+F_G(x);$
    solving an optimization problem;
    determining the q hard clustering;
    determining membership levels of each observation to each particular cluster within a fuzzy clustering referential; and
    updating the smoothing parameters $\gamma, \tau, \varepsilon$ and the boundary band width parameter $\delta$; and
  visually outputting the optimized clustering of the set of observations into groups represented by the set of centroids $x_i$ using the computer.

11. The non-transitory computer readable medium of claim 10 wherein the step of solving an optimization problem consists of solving a completely differentiable unconstrained optimization problem:

$$\text{minimize } F(x) = \sum_{j=1}^{m} (z_j)^2$$

starting at the initial starting point $x^{k-1}$ and obtaining an optimal solution $x^*$ used as the next starting point $x^k$, where the calculation of the objective function and its gradient is performed in two independent procedures:
  performing the calculation of the first part associated to the boundary band zone; and
  performing the calculation of the second part associated to the gravitational regions.

12. The non-transitory computer readable medium of claim 11 wherein the procedure for calculation of the first part of the objective function and its gradient, associated to the boundary band zone, consists of calculations $$F_B = \sum_{j \in J_B} (z_j(x))^2,$$

where each $z_j(x)$ results from the calculation of the zero of a general smooth equation $h_j(z_j,x)=0, j \in J_B,$ which assumes a particular smoothing procedure for the considered Euclidian metric, where the gradient of this part of the objective function can always be exactly calculated by the expression $$\nabla F_B(x) = \sum_{j \in J_B} 2z_j(x) \nabla z_j(x)$$

where $$\nabla z_j(x) = -\nabla h_j(z_j, x) \bigg/ \frac{\partial h_j(z_j, x)}{\partial z_j}.$$

13. The non-transitory computer readable medium of claim 12 wherein the smoothing procedure for the Euclidian metric considers the general smooth equation under the particular form:

$$h_j(z_j, x) = \sum_{i=1}^{q} \phi(z_j - \theta_2(s_j, x_i, \gamma), \tau) - \varepsilon = 0, \quad j \in J_B,$$

where $\phi(y, \tau) = \left(y + \sqrt{y^2 + \tau^2}\right)/2$ and $$\theta_2(s_j, x_i, \gamma) = \sqrt{\sum_{i=1}^{n} (s_j^l - x_i^l)^2 + \gamma^2}.$$

14. The non-transitory computer readable medium of claim 11 wherein the procedure for calculation of the second part of the objective function and its gradient, associated to the gravitational regions, is indeed performed by the following straightforward form $$F_G = \sum_{i=1}^{q} \sum_{j \in J_i} \|s_j - v_i\|^2 + \sum_{i=1}^{q} |J_i| \|x_i - v_i\|^2,$$

$$\nabla F_G(x) = \sum_{i=1}^{q} 2|J_i|(x_i - v_i)|$$

where $v_i$ is the center of the observations of each non-empty gravitational subset and $|J_i|$ is the number of gravitational observations of each subset.

15. The non-transitory computer readable medium of claim 10 wherein the step of determining the q hard clustering consists of calculating the set of q hard clusters, $C_i$, $i=1, \ldots, q$, where each cluster $C_i$ at each iteration k is formed by the set of observations for which the closest centroid is $x_i^*$;
  the step of determining membership levels $p_{ij}$ of each observation j to each particular cluster i within a fuzzy clustering referential consists of calculating at each iteration k values $p_{ij}$ by the expression $$p_{ij} = g(v_{ij}/\varepsilon) \bigg/ \sum_{l=1}^{q} g(v_{lj}/\varepsilon), \quad j = 1, \ldots, m, \quad i = 1, \ldots, q,$$

where $g: R \to R$, $g(0)=0$, $g(1)=1$ is an arbitrary monotonic crescent function and $v_{ij}$, the contribution of centroid i to the general smooth equation associated to observation j, is given by the expression: $v_{ij}=\phi(z_j-\theta_2(s_j,x_i^*,\gamma),\tau)$; and
  the step of updating the smoothing parameters consists of any manipulation procedure of parameters $\varepsilon, \tau, \gamma$, including the most traditional decreasing of the three parameters to zero in order to gradually approach the original problem formulation.

16. A non-transitory computer readable medium storing a program causing a computer including a processor and a memory, to execute a method of data mining by optimizing the clustering of a given set of m observations $s_j$, $j=1, \ldots, m$, each represented by n components, into a specified number of groups q, represented by a set of centroids $x_i$, $i=1, \ldots, q$, following the criterion of minimizing the sum of Manhattan distances $z_j$, defined as the shortest distance from each generic observation $s_j$ to the nearest centroid, according to the optimization formulation:

$$\text{minimize } F(x) = \sum_{j=1}^{m} z_j$$

$$\text{subject to: } z_j = \min_{x_i \in X} \|s_j - x_i\|_2, \quad j = 1, \ldots, m,$$

where $x=(x_1, x_2, \ldots, x_q) \in R^{nq}$, comprising the steps of:
performing an initialization step that includes choosing the first initial starting point $x^0$, choosing smoothing parameter values $\gamma, \tau, \varepsilon$ and specifying a boundary band width parameter $\delta$;
performing an iterative procedure until an arbitrary stopping rule is attained, with a counter of iterations k, initialized with a value of 1, comprises the steps of:
splitting the set of observations into two non-overlapping parts: the first set $J_B$ corresponds to the observations that are relatively close to two or more centroids based on the boundary band width parameter $\delta$, and the second set $J_G$ corresponds to the observations that are significantly close to a unique centroid in comparison to the other ones, then:

$$F(x) = F_B(x) + F_G(x);$$

solving an optimization problem;
determining the q hard clustering;
determining membership levels of each observation to each particular cluster within a fuzzy clustering referential; and
updating the smoothing parameters $\gamma, \tau, \varepsilon$ and the boundary band width parameter $\delta$; and
visually outputting the optimized clustering of the set of observations into groups represented by the set of centroids $x_i$ using the computer.

17. The non-transitory computer readable medium of claim 16 wherein the step of solving an optimization problem consists of solving a completely differentiable unconstrained optimization problem:

$$\text{minimize } F(x) = \sum_{j=1}^{m} z_j$$

starting at the initial starting point $x^{k-1}$ and obtaining an optimal solution $x^*$ used as the next starting point $x^k$, where the calculation of the objective function and its gradient is performed in two independent procedures:
performing the calculation of the first part associated to the boundary band zone; and
performing the calculation of the second part associated to the gravitational regions.

18. The non-transitory computer readable medium of claim 17 wherein the procedure for calculation of the first part of the objective function and its gradient, associated to the boundary band zone, consists of calculations $$F_B = \sum_{j \in J_B} z_j(x)$$

where each $z_j(x)$ results from the calculation of the zero of a general smooth equation $$h_j(z_j, x) = 0, \quad j \in J_B,$$

which assumes a particular smoothing procedure for the considered Manhattan metric, where the gradient of the objective function can be exactly calculated by the expression $$\nabla F_B(x) = \sum_{j \in J_B} \nabla z_j(x)$$

where $$\nabla z_j(x) = -\nabla h_j(z_j, x) \bigg/ \frac{\partial h_j(z_j, x)}{\partial z_j}.$$

19. The non-transitory computer readable medium of claim 18 wherein the smoothing procedure for the Manhattan metric considers the general smooth equation under the particular form:

$$h_j(z_j, x) = \sum_{i=1}^{q} \phi(z_j - \theta_1(s_j, x_i, \gamma), \tau) - \varepsilon = 0, \quad j \in J_B,$$

where $\phi(y, \tau) = \left(y + \sqrt{y^2 + \tau^2}\right)/2$ and $$\theta_1(s_j, x_i, \gamma) = \sum_{i=1}^{n} \sqrt{(s_j^i - x_i^i)^2 + \gamma^2}.$$

20. The non-transitory computer readable medium of claim 18 wherein the procedure for calculation of the second part of the objective function and its gradient, associated to the gravitational regions, is indeed performed by the following straightforward form $$F_G = \sum_{i=1}^{q} \sum_{l=1}^{n} \Bigg[ \sum_{j \in J_{il}^+} |s_j^i - v_i^l| - |J_{il}^+|\Delta x_i^l + \sum_{j \in J_{il}^-} |s_j^i - v_i^l| + |J_{il}^-|\Delta x_i^l + \sum_{j \in J_{il}^0} \sigma(s_j^i, v_i^l \gamma) \Bigg],$$

$$\nabla F_G = \sum_{i=1}^{q} \sum_{l=1}^{n} \Bigg[ -|J_{il}^+| + |J_{il}^-| + \sum_{j \in J_{il}^0} (s_j^i - v_i^l)/\sigma(s_j^i, v_i^l \gamma) \Bigg]$$

where $v_i$ is the referential centroid position used for the partition of the set of observations into two non-overlapping parts and $|J_{il}^+|$, $|J_{il}^-|$ and $|J_{il}^0|$ are the cardinality of the pertinent subsets.

21. The non-transitory computer readable medium of claim 16 wherein the step of determining the q hard clustering consists of calculating the set of q hard clusters, $C_i$, $i=1, \ldots, q$, where each cluster $C_i$ at each iteration k is formed by the set of observations for which the closest centroid is $x_i^*$;
the step of determining membership levels $p_{ij}$ of each observation j to each particular cluster i within a fuzzy clustering referential consists of calculating at each iteration k values $p_{ij}$ by the expression $$p_{ij} = g(v_{ij}/\varepsilon) \bigg/ \sum_{i=1}^{q} g(v_{ij}/\varepsilon), \quad j=1,\ldots,m, \quad i=1,\ldots,q,$$

where $g:R \rightarrow R$, $g(0)=0$, $g(1)=1$ is an arbitrary monotonic crescent function and $v_{ij}$, the contribution of centroid i to the general smooth equation associated to observation j, is given by the expression $v_{ij}=\phi(z_j-\theta_1(s_j,x_i^*,\gamma),\tau)$; and the step of updating the smoothing parameters consists of any manipulation procedure of parameters $\varepsilon$, $\tau$, $\gamma$, including the most traditional decreasing of the three parameters to zero in order to gradually approach the original problem formulation.

* * * * *